Feb. 17, 1931.  E. F. BENSON  1,793,353
COLLAPSIBLE RUNNING GEAR
Filed Sept. 21, 1928
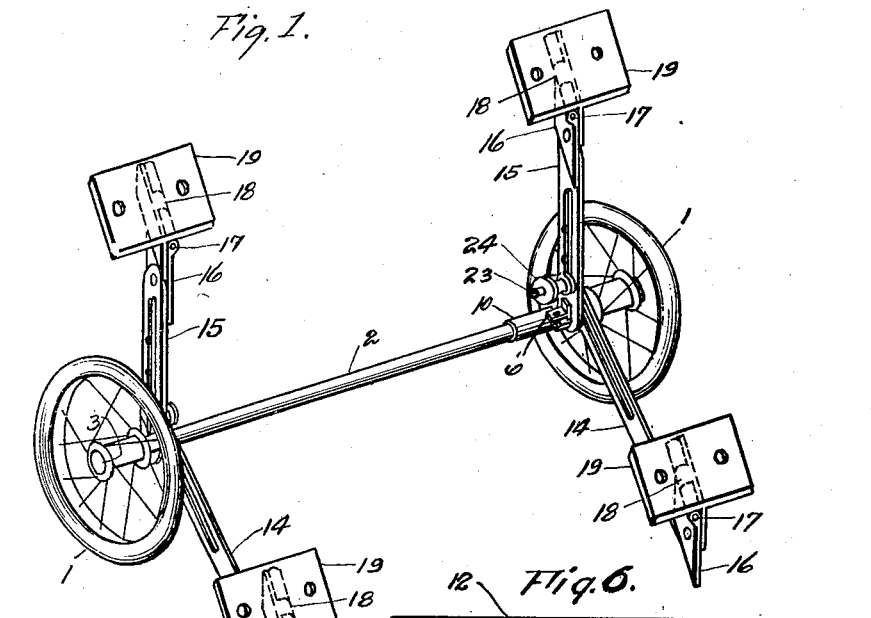
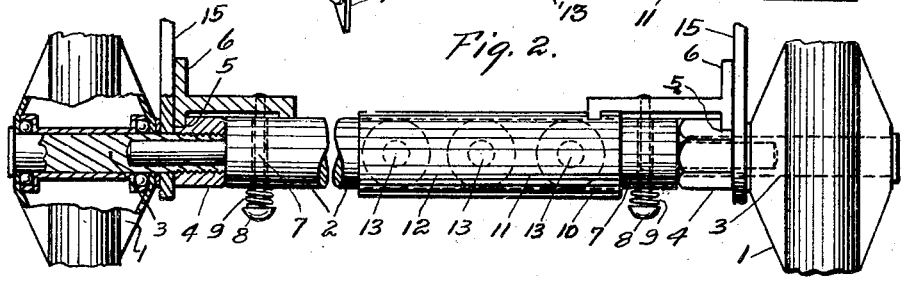
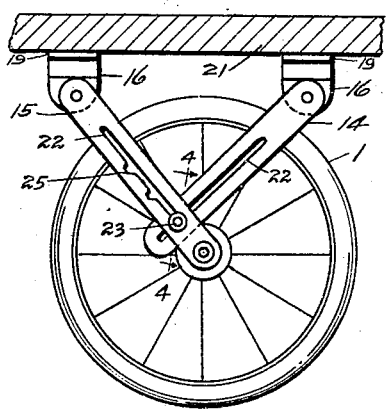
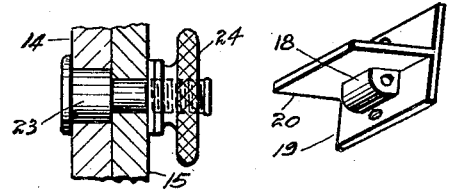
INVENTOR
*Edward F. Benson*
BY
*Clarence A. O'Brien*
ATTORNEY Patented Feb. 17, 1931

1,793,353

UNITED STATES PATENT OFFICE

EDWARD F. BENSON, OF WOODCLIFF ON HUDSON, NEW JERSEY

COLLAPSIBLE RUNNING GEAR

Application filed September 21, 1928. Serial No. 307,380.

The present invention relates to a collapsible running gear which is constructed to collapse when desired so as to enable the same to be retained in compact space on the articles to which it is attached and enable the same to be stored or packed for transportation in a convenient and compact manner.

A still further object is to provide means for adjusting the article to which the invention is attached with respect to the axle and wheels on which the same is mounted enabling the article to be raised or lowered with respect to the wheels.

A still further object is to provide an article of this character of simple and practical construction, strong and durable, which may be easily and quickly assembled or disassembled, which is neat and attractive in appearance and well adapted for the purpose for which the same is intended.

A still further object is to provide a running gear of this character whereby the design and construction when assembled and being packed for transportation, allow a maximum space of one wheel.

Other objects and advantages reside in the special construction and combination of the various elements comprising the invention, reference being had to the accompanying drawing forming a part hereof, wherein;

Figure 1 is a perspective view of the unit,

Figure 2 is a view in elevation of the axle, and wheels showing the manner of attaching the same to the body supporting arms, Figure 3 is a vertical longitudinal sectional view through the center of the running gear, Figure 4 is a vertical sectional view taken substantially along the line 4—4 of Figure 3, Figure 5 is a perspective view of one of the hinge plates for attaching the body supporting arm and Figure 6 is a detail of the sectional axle.

Referring now to the drawings in detail the invention comprises a collapsible running gear having wheels 1 rotatably mounted on axle extensions 3. When one or two pairs of wheels are required each pair of wheels are mounted on axle extensions 3 having their inner ends provided with longitudinal bores within which the reduced ends of an axle 2 are received. The axle extensions 3 are retained in the wheels 1 by nuts 4 having sockets 5 formed therein within which substantially hook shaped arms 6 are arranged and with the hooked ends thereof engaging the nuts whereby to retain the axle extensions in position upon the axle.

The opposite ends of the arms are provided with openings through which pins 7 extend, the pins being slidably received within openings formed in the axle and extending at the under side thereof and provided with heads 8.

Coil springs 9 are arranged on the pins and are interposed between the heads 8 and the axle whereby to yieldably restrain the sliding movement of the pins. Upon pressing the heads of the pins inwardly it will be apparent from an inspection of Figure 2 of the drawings that the arms 6 may be moved out of engagement with the nut sockets and thus enable the wheels to be removed from the axle.

The axle 2 is designed to be folded without removing the wheels by constructing a relatively short portion of the axle of a plurality of interfitting links 11 and 12 pivotally connected by pins 13 and slidably mounting the collar 10 upon the links to maintain the same in alinement. The collar 10 is of sufficient length to cover the series of links 11 and is retained on the axle to prevent accidental displacement by one of the hooked shaped arms 6, the hook end thereof engaging the collar in locked position upon the axle.

Body supporting arms 14 and 15 extend upwardly from the axle extensions and are inclined forwardly and rearwardly respectively, the upper end of each of the arms being pivotally attached with the lower end of a link 16. The upper ends of the links are provided with longitudinally extending bores through which pins 17 are inserted with their opposite ends journaled in bearing members 18 formed at the under side of body attaching brackets 19.

A plate 20 extends downwardly from the under side of each bracket 19 and is arranged in abutting relation with the outer face of an associated link 16 as shown in Figure 1 whereby to present side sway of the body of the article to which the bracket 19 is attached.

The brackets 19 are secured to the under side of a body 21 which may be raised or lowered with respect to the axle and secured in vertically adjusted position by providing the arms 14 and 15 with longitudinally extending slots 22 with a pin 23 inserted therethrough and having a nut 24 threaded on one end of the pin whereby to secure the lower end of the arm 14 in adjusted position with respect to the arm 15.

Notches 25 are formed in slotted openings formed in the arm 15 forming seats for the pin 23 so as to prevent accidental displacement of the pin in its adjusted position. In providing for the adjustment it will be noted upon an inspection of Figures 3 and 4 of the drawings that the lower ends of the arm 14 are supported entirely by reason of their connection with the pins 23 and the lower ends of the arm 15 are supported by the axle extension.

It will be apparent from the foregoing explanation that the parts as arranged will enable the running gear to be folded in collapsed position to be conveniently stored or shipped.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. A vehicle mounting comprising an axle, extensions removably attached at the ends thereof forming wheel bearings, interlocking means carried by the axle, releasably engaging the extensions, arms extending upwardly from the extensions and arranged in pairs, means for adjustably connecting the arms of each pair, vehicle body attaching brackets pivotally carried at the upper ends of the arm and means cooperating with said brackets to prevent side sway of the brackets with respect to the arms in one direction.

2. A vehicle mounting comprising an axle, extensions removably attached at the ends thereof forming wheel bearings, interlocking means carried by the axle, releasably engaging the extensions, arms extending upwardly from the extensions and arranged in pairs, means for adjustably connecting the arms of each pair, vehicle body attaching brackets having plates depending therefrom and links pivotally connecting the arms with the brackets and engaging one side of the plates to prevent side sway of the body in one direction.

3. A vehicle mounting comprising a sectional axle having its sections pivotally connected, a collar slidably mounted on the axle for retaining the sections in alinement, extensions removably attached at the ends of the axle forming wheel bearings and interlocking means carried by the axle releasably engaging the extensions and the collar for securing the same against longitudinal movement.

4. A vehicle mounting comprising a sectional axle having its sections pivotally connected, a collar slidably mounted on the axle for retaining the sections in alinement, extensions removably attached at the ends of the axle forming wheel bearings and double ended locking members each having one end releasably engageable with one of said extensions and one of said members having its opposite end releasably engageable with said collar and spring retracted pins carried by the axle and attached to the members for yieldably retaining the same in locked position.

Signed at Woodcliff on Hudson, in the county of Hudson and State of New Jersey, this 17th day of September, A. D. 1928.

EDWARD F. BENSON.